United States Patent [19]
Evans et al.

[11] Patent Number: 5,892,644
[45] Date of Patent: Apr. 6, 1999

[54] PASSIVE FAULT CURRENT LIMITING DEVICE

[75] Inventors: Daniel J. Evans, Wheeling; Yung S. Cha, Darien, both of Ill.

[73] Assignee: The University of Chicago, Chicago, Ill.

[21] Appl. No.: 975,431

[22] Filed: Nov. 20, 1997

[51] Int. Cl.$^6$ ................................................. H02H 7/00
[52] U.S. Cl. ........................... 361/19; 361/58; 361/93
[58] Field of Search ........................... 361/19, 54, 58, 361/59, 71, 93, 103, 117, 141

[56] References Cited

U.S. PATENT DOCUMENTS

| | | | |
|---|---|---|---|
| 3,703,664 | 11/1972 | Cronin .................................. | 361/58 |
| 5,021,914 | 6/1991 | Tsurunaga et al. ..................... | 361/19 |
| 5,225,956 | 7/1993 | Hara et al. ............................. | 361/19 |
| 5,414,586 | 5/1995 | Hara et al. ............................. | 361/19 |
| 5,617,280 | 4/1997 | Hara et al. ............................. | 361/19 |

OTHER PUBLICATIONS

Publication entitled "Tests of 100 kW High-$T_c$ Superconducting Fault Current Limiter," by W. Paul, Th. Baumann, J. Rhyner, and F. Platter, pp. 1059–1062, published in IEEE Transactions on Applied Superconductivity, vol. 5, No. 2, Jun. 1995.

Publication entitled "Recovery Time of Superconducting Non–Inductive Reactor Type Fault Current Limiter," by T. Hoshino, I. Muta, H. Tsukiji, K. Ohkubo, and M. Etoh, pp. 2403–2406, published in IEEE Transactions on Magnetics, vol. 32, No. 4, Jul. 1996.

Publication entitled "Short Circuit Test Performance of Inductive High $T_c$ Superconducting Fault Current Limiters," by D.W.A. Willen and J.R. Cave, pp. 1047–1050, published in IEEE Transactions on Applied Superconductivity, vol. 5, No. 2, Jun. 1995.

*Primary Examiner*—Jeffrey Gaffin
*Assistant Examiner*—Kim Huynh
*Attorney, Agent, or Firm*—Emrich & Dithmar

[57] ABSTRACT

A passive current limiting device and isolator is particularly adapted for use at high power levels for limiting excessive currents in a circuit in a fault condition such as an electrical short. The current limiting device comprises a magnetic core wound with two magnetically opposed, parallel connected coils of copper, a high temperature superconductor or other electrically conducting material, and a fault element connected in series with one of the coils. Under normal operating conditions, the magnetic flux density produced by the two coils cancel each other. Under a fault condition, the fault element is triggered to cause an imbalance in the magnetic flux density between the two coils which results in an increase in the impedance in the coils. While the fault element may be a separate current limiter, switch, fuse, bimetal strip or the like, it preferably is a superconductor current limiter conducting one-half of the current load compared to the same limiter wired to carry the total current of the circuit. The major voltage during a fault condition is in the coils wound on the common core in a preferred embodiment.

15 Claims, 4 Drawing Sheets

5,892,644

PASSIVE FAULT CURRENT LIMITING DEVICE

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

FIELD OF THE INVENTION

This invention relates generally to a passive current limiting device particularly adapted for use in high power applications and is particularly directed to a current limiter having a low impedance over a specified current range which passively and automatically presents a high impedance when the current exceeds a predetermined value for limiting excessive currents under a fault condition.

BACKGROUND OF THE INVENTION

A wire wound into a coil with overlapping layers (turns) insulated from one another functions as an inductive element and is commonly used in a current limiting application. Winding the coil around a material having little resistance to the flow of magnetic flux, i.e., a material which is easily magnetized, increases the inductance. Electrically conductive coils are frequently wound around a ferromagnetic core to increase the inductance. The inductance can be even further increased by using a "closed loop core," which is a core forming a ring or square or similar unbroken path. Alternatively, if a low inductance is desired, two coils may be wound in magnetic opposition on the same closed loop core, with the magnetic field of each coil cancelling the other. This produces a low impedance effect. When there is an imbalance in the currents between the two coils, the impedance increases. The capability to alter the impedance of the inductor by controlling the balance of the magnetic flux density forms the basis for use of the coil as a fault current limiter.

One approach to fault current limiting using a pair of magnetically coupled coils is disclosed in "Recovery Time of Superconducting Non-Inductive Reactor Type Fault Current Limiter," by T. Hoshino et al., Transactions on Magnetics, Vol. 32, No. 4, July 1996, which discloses the use of two superconducting coils with different critical currents non-inductively wound on a magnetic core in magnetic opposition. Under normal operating conditions, both coils are in the superconducting state and there is little resistance across the two coils. Current is shared equally between the two coils and there is no inductive voltage drop either across the coils. Under fault conditions one or both critical currents are exceeded to cause an imbalance in the currents in the coils and an increase in impedance for limiting the fault current. Because one of the coils must first become non-superconducting to provide the necessary resistance, restoration of normal operating conditions with removal of the fault may be delayed until the resistance in the coils decays to a low value and excessive heating may occur. Another approach to a superconducting fault current limiter is disclosed in "Tests of 100 kW High-$T_c$ Superconducting Fault Current Limiter," by W. Paul et al., IEEE Transactions on Applied Superconductivity, Vol. 5, No. 2, June 1995, which discloses an inductive superconductor fault current limiter where a superconductor shield prevents the formation of a field in the ferromagnetic core. Because this device is triggered magnetically and carries the total current load in the circuit, high currents in the circuit under normal conditions restrict the number of turns in the windings and limit performance under fault conditions. The current limiting performance of inductive fault current limiters based on Bi-2212 high temperature superconducting tubes is discussed in "Short Circuit Test Performance of Inductive High $T_c$ Superconducting Fault Current Limiters," by D. W. A. Willen et al., IEEE Transactions on Applied Super-conductivity, Vol. 5, No. 2, June 1995.

The present invention addresses the aforementioned limitations of the prior art by providing a passive fault current limiting device which presents a low impedance over a specified range of currents, converting passively and automatically to a large impedance when the current exceeds a predetermined design limit, and then passively and automatically returning to a low impedance value when the excessive current level drops below the design limit. The inventive fault current limiting device is capable of handling the electromechanical forces and thermal effects of large power components and is in the form of a small, easily installed and maintained package which can be economically manufactured.

OBJECTS AND SUMMARY OF THE INVENTION

Accordingly, it is an object of the present invention to limit electrical current in a circuit in a fault condition such as a short.

It is another object of the present invention to provide a current limiting device particularly adapted for use in high power applications which has low impedance over a specified current range and which passively and automatically presents a large impedance when the current exceeds a predetermined limit.

Yet another object of the present invention is to provide a current limiting device capable of handling the electromechanical forces and thermal effects of large power components and which is small in size, easy to install and maintain, and economical to manufacture.

It is yet another object of the present invention to provide an isolator in an electrical power distribution system which, upon the occurrence of a downstream fault, reduces current to downstream users while maintaining current to upstream users.

This invention contemplates fault current limiting apparatus for limiting excessive current in a circuit, the apparatus comprising: a first coil carrying a first current producing a first magnetic flux; a second coil magnetically coupled to the first coil and carrying a second current producing a second magnetic flux, wherein the first and second magnetic fluxes are opposed and cancel each other to provide a low impedance under normal operating conditions; and fault detection means connected in series with the second coil and responsive to a large fault current in the second coil for producing a magnetic flux density imbalance about the magnetic core and increasing the impedance in the first and second coils for limiting the fault current in the circuit.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, in which:

DETAILED DESCRIPTION OF THE PREFERRED EMBODIMENT

Figure 1:
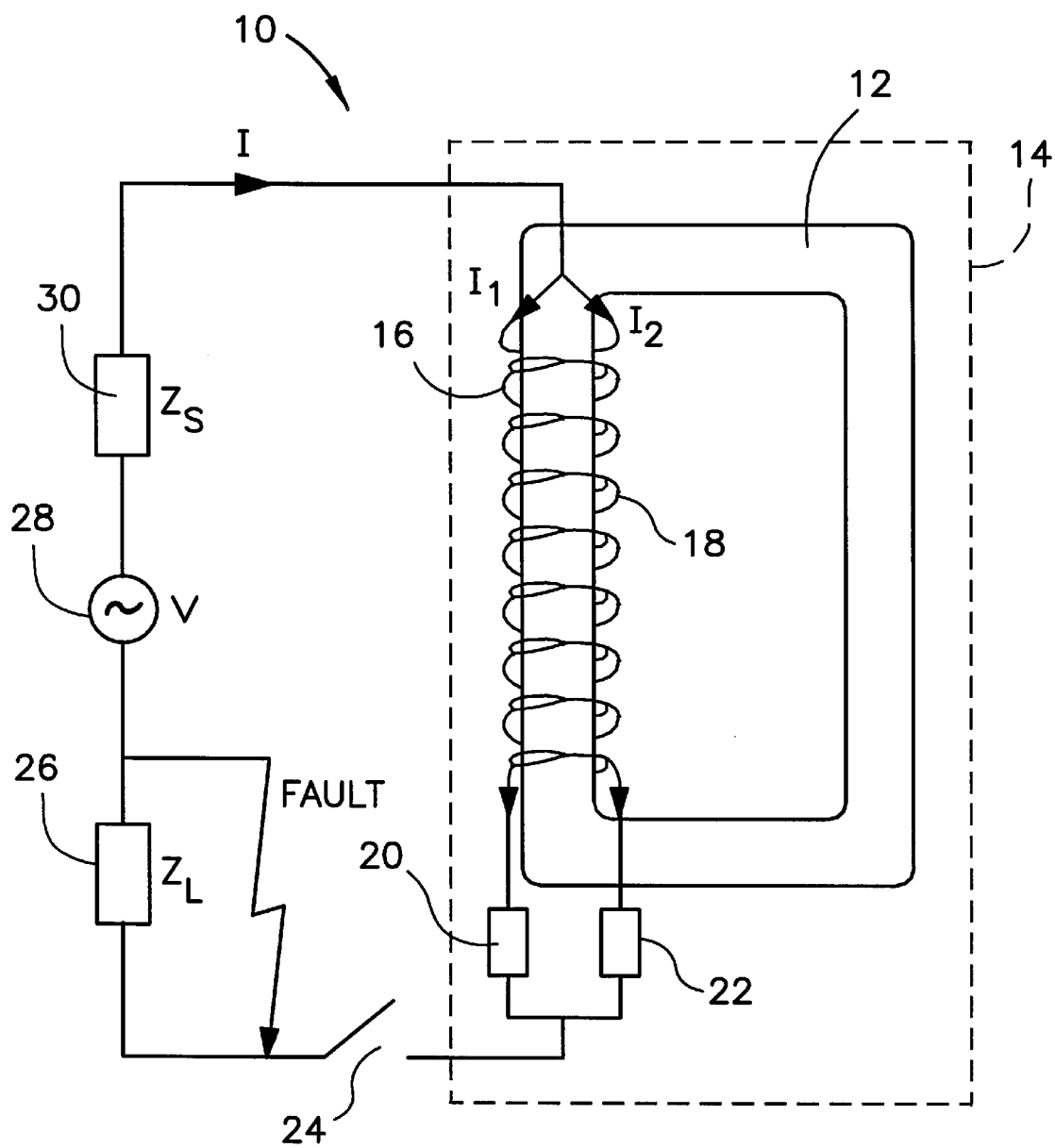
FIG. 1 is a simplified combined block and schematic diagram of a passive fault current limiting device in accordance with the present invention.

Referring to FIG. 1, there is shown a combined simplified schematic and block diagram of a passive fault current limiting (FCL) device 10 in accordance with the present invention. FCL device 10 includes first and second coils 16 and 18 coupled in parallel and wound non-inductively about an air or ferromagnetic core 12. The first coil 16 is wound counterclockwise about core 12, while the second coil 18 is wound clockwise about core 12. The first and second parallel coils 16,18 may be either superconductors having either a high or a low critical temperature $T_c$ or they may be comprised of a non-superconducting metal such as copper. The first and second coils 16,18 are thus wound in magnetic opposition to one another and are connected in parallel on the common core 12. An impedance matching device 20 is connected in series with the first coil 16, while a fault current limiter 22 is connected in series with the second coil 18. The impedance matching device 20 provides essentially equal impedance in the first and second coils 16,18 under normal operating conditions. In a preferred embodiment, the fault current limiter 22 is comprised of a superconductor shielded core reactor (SSCR), which under normal operating conditions has a very low inductance because its core is shielded from the external magnetic field by a superconductor tube which is not shown in the figure but is described below. A liquid nitrogen container 14 shown in dotted line form in the figure may enclose the core 12 and the first and second coils 16,18, and should enclose the fault current limiter 22 when the fault current limiter includes a superconductor.

A circuit breaker 24 and a voltage source 28 are connected in series with the first and second parallel coupled coils 16 and 18. Voltage source 28 has a source impedance $Z_S$ identified as element 30 in the circuit diagram. The circuit has a load impedance $Z_L$ identified as element 26 in the figure. A fault in the circuit is shown across the load impedance $Z_L$ 26 in the figure.

Figure 2:
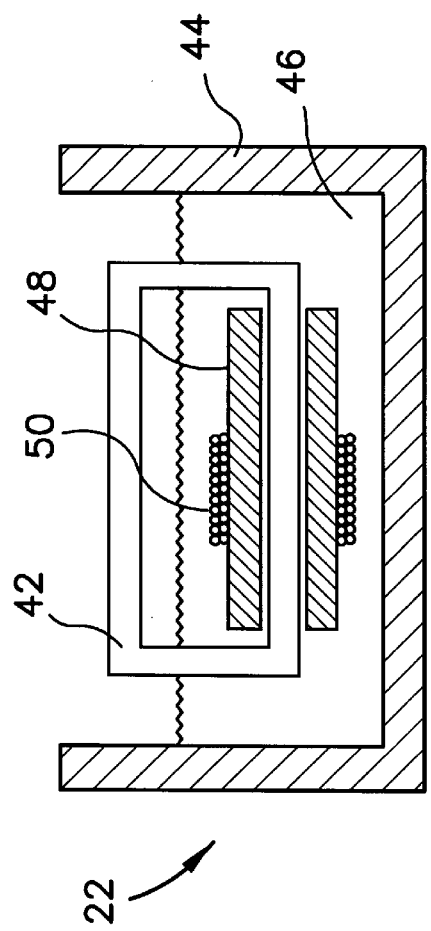
FIG. 2 is a simplified sectional view of a fault current limiter employing a superconducting tube in accordance with one aspect of the present invention.

Referring to FIG. 2, there is shown a simplified sectional view of a preferred embodiment of the fault detection switch, or fault current limiter, 22 coupled to the second coil 18. Fault current limiter 22 is preferably a superconductor shielded core reactor and includes a steel core 42 disposed in a container 44 which is partially filled with liquid nitrogen 46. Disposed about one leg of the closed steel core 42 and submerged in the liquid nitrogen 46 is a superconductor tube 48. Wrapped around the superconductor tube 48 and also submerged in the liquid nitrogen 46 is a copper or superconductor coil 50 which is connected in series with the second coil 18 of the passive fault current limiting device 10 shown in FIG. 1. Current flowing through the second coil 18 of the passive fault current limiting device 10 also passes through the copper or superconductor coil 50 in the fault current limiter 22.

Under normal operating conditions, the inductance of the fault current limiter 22 is very low because core 42 is shielded from the external magnetic field by the superconductor tube 48. The voltage drop across either one of the first and second parallel coils 16,18 in the passive fault current limiting device 10 can be kept as low as possible by maintaining current symmetry (equal in magnitude, but opposite in direction) in the two coils if the number of turns in the two coils is equal. Further reduction in impedance under normal operating conditions can be achieved in one embodiment of the invention by using the impedance matching device 20. Under a fault condition, the shielding capability of the superconductor tube 48 is exceeded and the inductance of the superconductor fault current limiter 22 increases to a much higher value which breaks the current symmetry/equality between the first and second coils 16,18 and provides the necessary impedance to limit the fault current. If the parallel first and second coils 16,18 are made of either two identical superconductors or two identical metal conductors, the triggering mechanism is inductive rather than resistive. By proper design and choice of materials, e.g., if two superconductor coils with different critical currents or if two metal conductors with different voltage-current characteristics are used, the triggering mechanism will be a combination of inductive and resistive action. This type of FCL can have a number of combinations for coil materials, electrical characteristics (voltage vs. current), and operating temperatures. The coil for the fault current limiter 22 can be made of either copper or a superconductor. The fault current limiter 22 can be operated at 77 K or lower temperature. The first and second parallel coils 16,18 can be operated at room temperature or at cryogenic temperatures if metal conductors are used. The parallel first and second coils 16,18 can have either an air or a ferromagnetic core.

Figure 3:
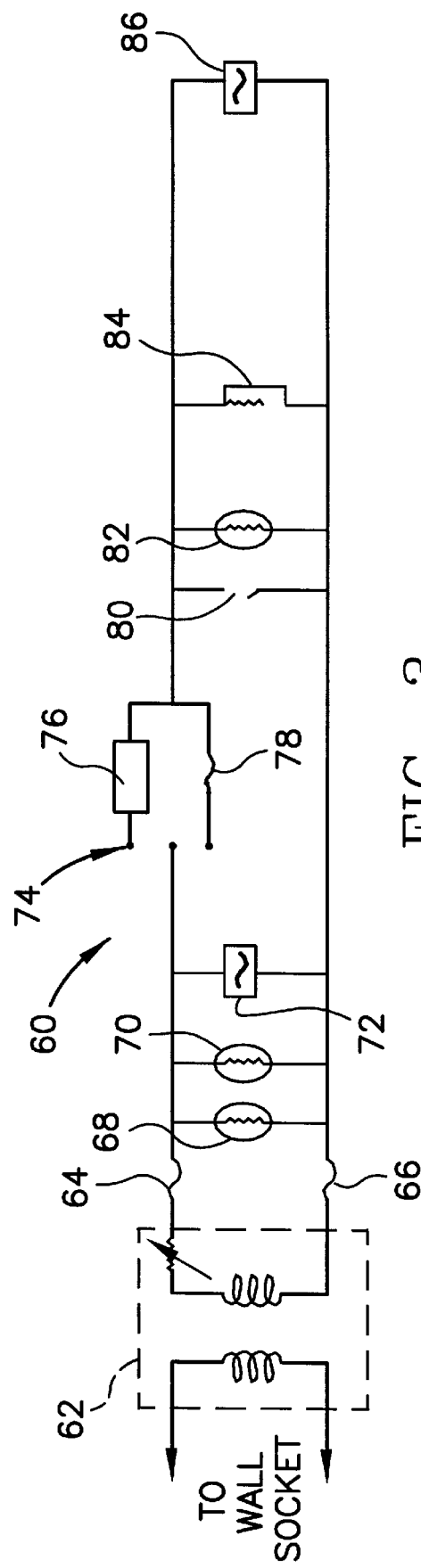
FIG. 3 is a combined block and schematic diagram of a circuit incorporating a superconducting shielded core reactor.

Referring to FIG. 3, there is shown a combined block and schematic diagram of a circuit 60 incorporating a superconducting shielded core reactor. Circuit 60 includes an isolation transformer 62 electrically coupled to a wall socket which is not shown in the figure for simplicity. Coupled in series with the isolation transformer 62 are first and second fuses 64 and 66. Connected across the two lines from the isolation transformer 62 is the combination of a digital clock 68, a light bulb 70, and a first oscilloscope channel 72. A fuse/FCL switch 74 incorporating a fault current limiter 76 in accordance with the present invention is connected to one line from the isolation transformer 62 and also includes a fuse 78. Also connected across the lines extending from the isolation transformer 62 are a fault switch 80, a second light bulb 82, arcing 84 and a second oscilloscope channel 86. When the switch 74 is in contact with the fault current limiter 76, with a fault downstream from the fuse/FCL switch 74 such as arching 84, or fault switch 80, current to the downstream components such as light bulb 82 and the second oscilloscope channel 86 is reduced while current to upstream components such as digital clock 68, light bulb 70 and the first oscilloscope channel 72 is maintained. The fuse/FCL switch 84 incorporating the fault current limiter 76 not only limits current in a fault condition, but also serves as an isolator between the upstream and downstream components in the event of a fault condition.

Figure 4:
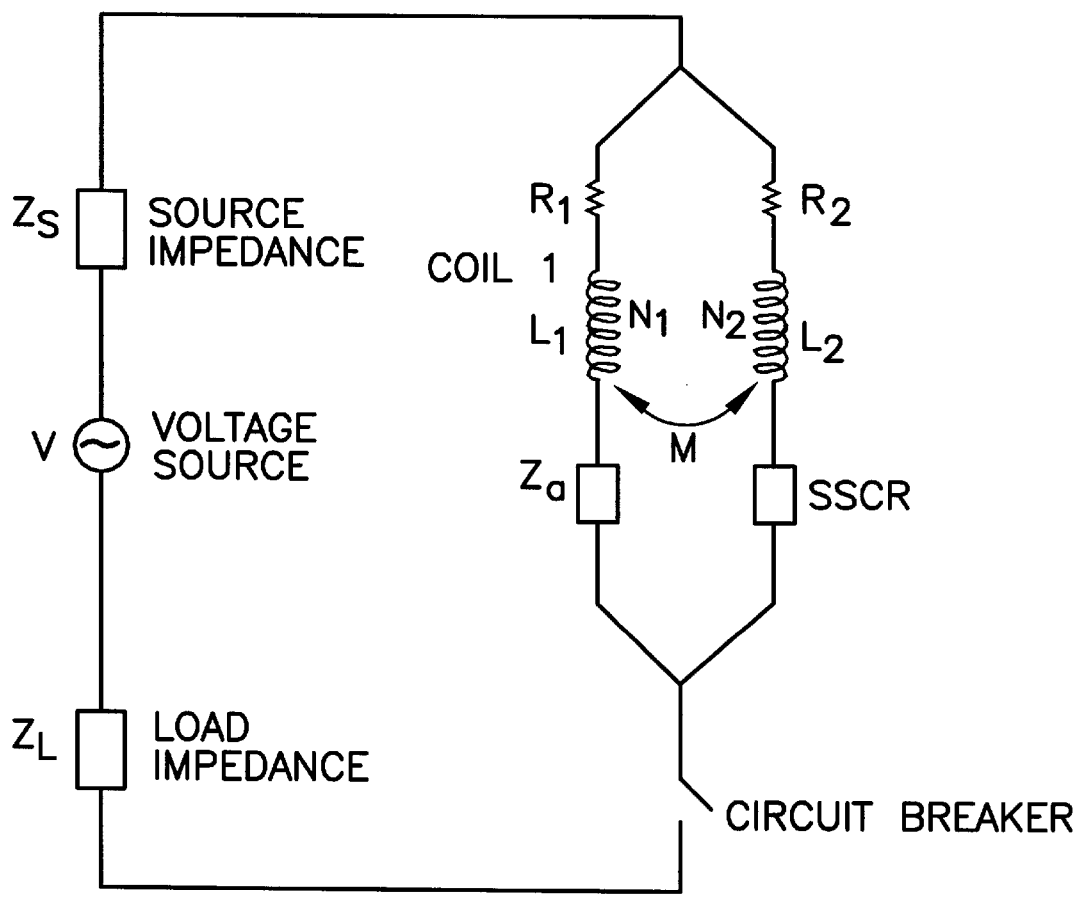
FIG. 4 is a combined schematic and block diagram of an equivalent circuit of the passive fault current limiting device of the present invention.

The equivalent circuit of the inventive passive fault current limiting device 10 is shown in FIG. 4, where $L_1$ and $L_2$ are the self inductance of coils 16 and 18; respectively, M is the mutual inductance between the two coils, $R_1$ is the resistance of coil 16 ($R_1=0$ if the coil is made of a superconductor, $R_2$ is the resistance of coil 18 plus that of the coil for the fault current limiter 22 ($R_2=0$ if coil 18 and the coil for the fault current limiter are made of superconductors), and $L_S$ is the inductance of the fault current limiter ($L_S=0$ under normal operating conditions). $Z_a$ is a small matching impedance to balance the current under normal operating conditions. Under normal operating conditions, the current is shared equally between coils 16 and 18 and the magnetic fluxes generated by the two coils cancel each other if the number of turns in the two coils is the same. The two coils are considered to be geometrically identical for the following analysis, thus $L_1=L_2=L$, and $$M=k(L_1L_2)^{1/2}=kL. \quad (1)$$

However, in general, $L_1$ does not have to be equal to $L_2$. The voltage drops across coils 16 and 18 are $$v_1=L_1(di_1/dt)-M(di_2/dt)+R_1i_1, \text{ and} \quad (2)$$

$$v_2=-M(di_1/dt)+(L_S+L_2)(di_2/dt)+R_2i_2; \quad (3)$$

respectively, and $i_1$ and $i_2$ are the currents in coils 16 and 18; respectively. Let $$i_1=i_{10}e^{j\omega t}, \text{ and} \quad (4)$$

$$i_2=ae^{j\theta}i_1 \quad (5)$$

where $\omega$ is the angular frequency of the power source, $\theta$ is the phase angle between $i_1$ and $i_2$, and a is the amplitude ratio $$a=i_{20}/i_{10}, \quad (6)$$

In order to obtain the forced response of the system, we set $$v_1=v_2. \quad (7)$$

Substituting equations 1 through 5 into equation 7, then equating the real and imaginary parts of the resulting equation, we obtain $$a \cos \theta=(\tau \tau_L\omega^2+\gamma)/(1+\tau^2\omega^2), \text{ and} \quad (8)$$

$$a \sin \theta=[\tau\omega(1-\gamma)-\tau_S]/(1+\tau^2\omega^2). \quad (9)$$

where the time constants $\tau_L$, $\tau_S$, and $\tau$ are given by $$\tau_L=L(1+k)/R_2, \quad (10)$$

$$\tau_S=L_S/R_2, \text{ and} \quad (11)$$

$$\tau=\tau_L+\tau_S. \quad (12)$$

Equations 8 and 9 can be solved simultaneously to give $$a^2=[(\tau_L\omega)^2+\gamma^2)]/(1+\tau^2\omega^2). \quad (13)$$

The fault current $i_f$ is the sum of $i_1$ and $i_2$, $$i_f=i_1+i_2=i_{f0} e^{j(\omega t+\alpha)}, \quad (14)$$

where $\alpha$ is the phase angle of the fault current with respect to $i_1$, $i_{f0}$ is the amplitude of the fault current, and they are shown to be $$\alpha=\tan^{-1}[a \sin \theta/(1+a \cos \theta)], \text{ and} \quad (15)$$

$$i_{f0}=i_{10}(1+2 a \cos\theta+a^2)^{1/2} \quad (16)$$

The voltage drop across the fault current limiter can be obtained from either equation 2 or 3. Substituting equations 4 and 5 into equation 2, the result turns out to be $$v_1=v_{10}e^{j(\omega t+\beta)} \quad (17)$$

where $$v_{10}=\omega Li_{10}[1+k^2a^2-2ka \cos \theta+2\gamma(1+k)k \, a \sin \theta/(\omega\tau_L)+\gamma^2(1+k)^2/(\omega\tau_L)^2]^{1/2}, \text{ and} \quad (18)$$

$$\beta=\tan^{-1}[\omega L(1-k \, a \cos \theta)/(\omega \, L \, k \, a \sin \theta+R_1)]. \quad (19)$$

When $\gamma=0$ and $\tau_S=0$, equation 18 can be shown to reduce to $$v_{10}=\omega Li_{10}[1+k^2a^2-2ka^2]^{1/2} \quad (20)$$

Figure 5:
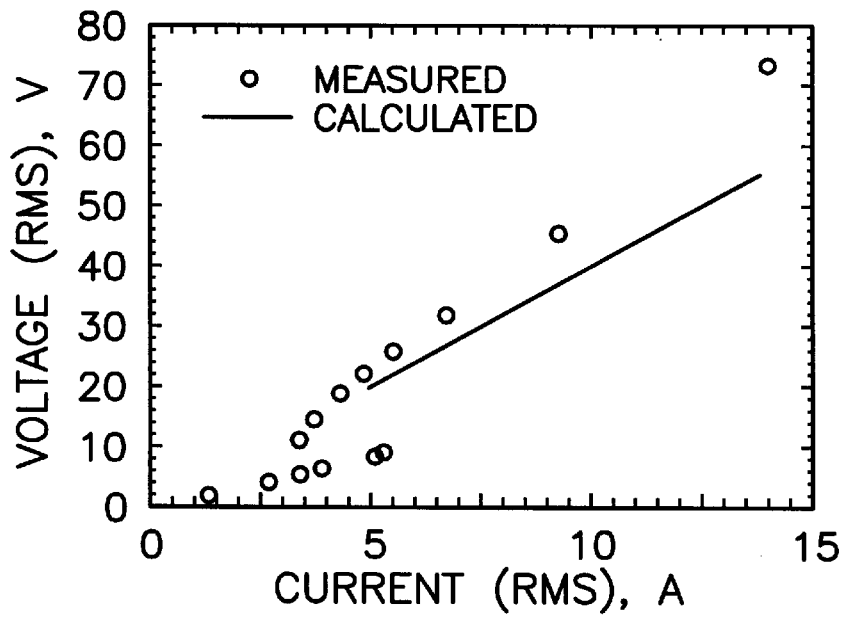
FIG. 5 is a graphic comparison between calculated and measured voltage-current characteristics of a fault current limiter in accordance with the principles of the present invention.

Equation 20 is identical to a solution reported in "Analysis of a Passive Superconducting Fault Current Limiter," by Cha, et al., submitted to IEEE Trans. on Applied Superconductivity, February, 1997, which corresponds to the special case where coil 16 is made of a superconductor with a critical current higher than that of coil 18 and no SSCR was employed in the fault current limiter 22. Referring to FIG. 5, there is shown a graphic comparison between calculated and measured voltage-current characteristics of a small scale fault current limiting device in accordance with the present invention.

There has thus been shown a novel passive current limiting device and isolator which is particularly adapted for use at high power levels for limiting excessive currents in a circuit in a fault condition such as an electrical short. The passive current limiting device presents a low impedance over a specified range of currents and passively and automatically converts to a large impedance when the current exceeds a predetermined design limit. The impedance remains high in the current limiting device so long as the current exceeds the design limit, with the device's impedance passively and automatically returning to a low value when the current drops below the design limit. The passive current limiting device is capable of handling the electromechanical forces and thermal effects of large power components and is easily installed and maintained and economically manufactured in a small package. The coils 16 and 18 as well as the fault current limiter 22 may have various configurations and be comprised of various materials as indicated by the following.

Coils 16 and 18

(1) Both coils can be made of superconductors with identical critical currents.

(2) Both coils can be made of superconductors with different critical currents ($I_{c1}>I_{c2}$).

(3) Both coils can be made of normal metal (or alloy) conductors with identical voltage versus current characteristics.

(4) Both coils can be made of normal metal (or alloy) conductors with different voltage versus current characteristics.

(5) One coil can be a superconductor and the other coil can be a normal metal (or alloy) conductor.

Fault Current Limiter 22

(a) It can be made of a superconductor shielded core reactor as described above. The coil outside the superconductor tube can be either a normal metal coil or a superconductor coil. The triggering mechanism will be primarily inductive.

(b) It can be simply two non-inductively wound superconductor coils connected in series. The triggering mechanism will be resistive.

(c) It is not present ($Z_b=0$).

(d) It can be a circuit breaker or various other switching devices.

Any combination of items 1 through 5 above for coils 16 and 18 and items a through d above for the triggering element $Z_b$ will function as a fault current limiter with the exception of the combination of 1 and c, and 3 and c. The above combinations represent a new class of passive fault current limiters. In addition to the various combinations described above, the present invention is characterized by the following features.

I. The common core between coils 16 and 18 can be either an air core or a ferromagnetic core.

II. The superconductors can be either low- or high-temperature superconductors.

III. If superconductor coils are used in the device, under fault conditions the superconductor coils can be designed to operate in either the normal state or the flux-flow state. The latter has the advantage of less heat generation.

IV. If normal metal (or alloy) conductors are used for coils 16 and 18, these coils can be maintained at room or cryogenic temperatures.

V. The inductances $L_1$ and $L_2$ can be either equal or not equal to each other.

Figure 6:
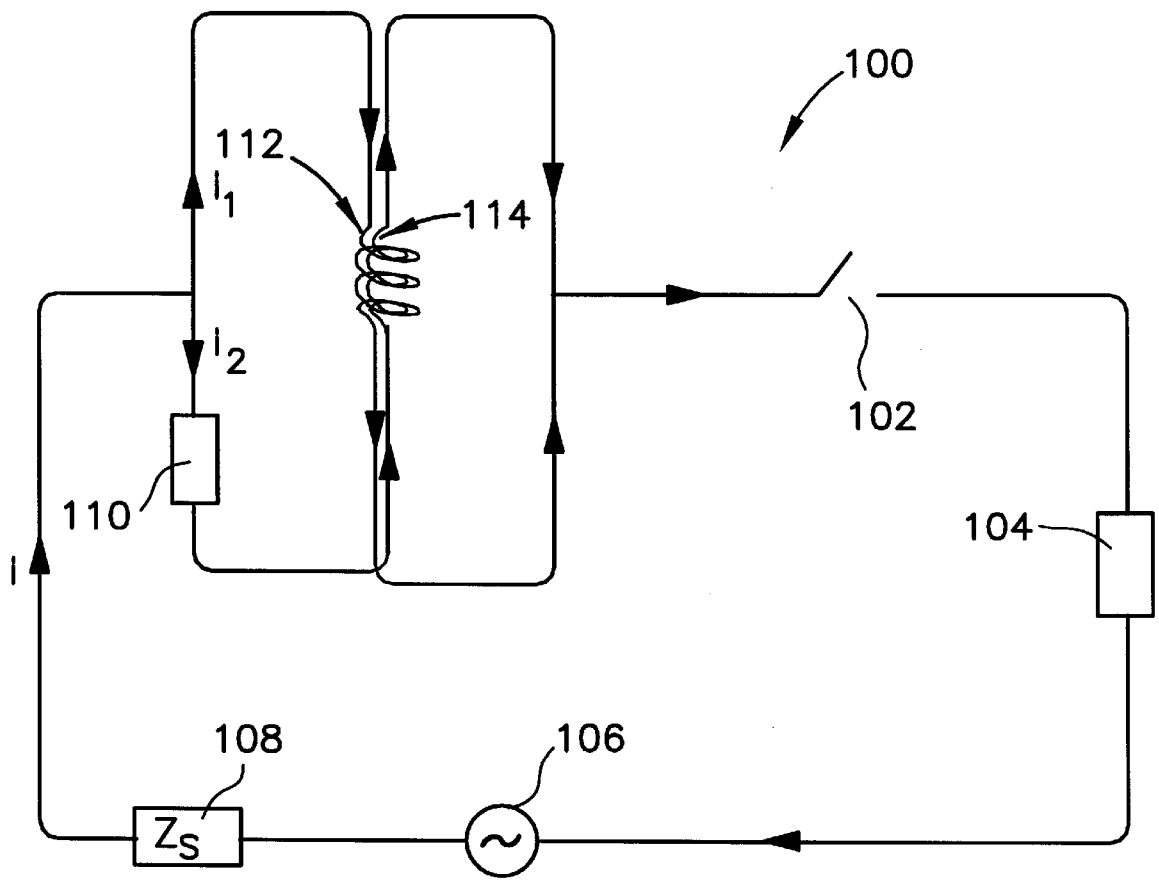
FIG. 6 is a combined block and schematic diagram of another embodiment of a passive fault current limiting device in accordance with the present invention.

Referring to FIG. 6 there is shown a combined simplified schematic and block diagram of a passive fault current limiting (FCL) device 100 in accordance with another embodiment of the present invention. FCL device 100 includes first and second coils 112 and 114 coupled in parallel and wound non-inductively about an air or ferromagnetic core which is not shown in the figure for simplicity. Coils 112 and 114 are wound in the same direction about the air or ferromagnetic core, but the manner in which the two coils are connected in parallel provides currents in each of the coils which are in opposite directions so that the magnetic flux adjacent the wound portions of the coils cancels. The figure shows the current $i_1$ in the first coil 112 flowing in a first direction and a second current $i_2$ flowing in the second coil 114 in a second, opposed direction to cancel the magnetic flux adjacent the wound portions of the coils. A fault current limiter 110 in accordance with the present invention is coupled in series with the second coil 114. As in the previously described embodiment, the first and second parallel coils 112,114 may be either high or low temperature superconductors or they may be comprised of a non-superconducting metal such as copper. Similarly, the fault current limiter 110 is preferably comprised of a SSCR, having a low inductance under normal operating conditions as described above. The SSCR is cooled by conventional means such as a liquid nitrogen bath which also is not shown in the figure for simplicity. A circuit breaker 102 and a voltage source 106 are connected in series with the first and second parallel coupled coils 112,114. Voltage source 106 has a source impedance $Z_S$ identified as element 108 in the circuit diagram, while the load in the circuit is identified as 104. Current in the circuit flows in the direction of the arrows in the figure.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. Fault current limiting apparatus for limiting excessive current in a circuit, said apparatus comprising:

a first coil carrying a first current producing a first magnetic flux;

a second coil magnetically coupled to said first coil and carrying a second current producing a second magnetic flux, wherein said first and second magnetic fluxes are opposed and cancel each other to provide a low impedance under normal operating conditions; and fault detection means connected in series with said second coil and responsive to a large fault current in said second coil for producing a magnetic flux density imbalance and inductively increasing the impedance in said first and second coils for limiting the fault current in the circuit.

2. The apparatus of claim 1 wherein said fault detection means is a superconducting current limiter.

3. The apparatus of claim 2 wherein said superconducting current limiter comprises a superconducting shielded core reactor including a superconducting tube disposed about a second magnetic core and a third coil wrapped around said superconducting tube, wherein said third coil is coupled in series with said second coil and said superconducting tube shields said second core from said third coil until the current in said third coil exceeds a predetermined value, where upon the impedance of said third coil increases and limits the fault current in the circuit.

4. The apparatus of claim 1 wherein said first and second coils are superconductors.

5. The apparatus of claim 4 wherein said first and second coils have the same critical current.

6. The apparatus of claim 1 wherein said first and second coils are comprised of a non-superconducting metal.

7. The apparatus of claim 6 wherein said first and second coils have substantially identical voltage versus current characteristics.

8. The apparatus of claim 1 further comprising impedance matching means coupled to said first coil for matching the impedance in said first and second coils under normal operating conditions.

9. The apparatus of claim 1 further comprising a ferromagnetic core, wherein said first and second coils are wrapped around and magnetically coupled by said ferromagnetic core.

10. The apparatus of claim 1 wherein said first and second coils are connected in parallel and said first coil is wound in a first direction and said second coil is wound in a second, opposed direction.

11. The apparatus of claim 1 wherein said first and second coils are connected in parallel and are wound in a common direction, and wherein said first coil carries a first current in a first direction and said second coil carries a second current in a second, opposed direction.

12. The apparatus of claim 1 wherein said first coil has a first inductance and said second coil has a second inductance, and wherein said first and second inductances are equal.

13. The apparatus of claim 1 wherein said first coil has a first inductance and said second coil has a second inductance, and wherein said first and second inductances are not equal.

14. The apparatus of claim 13 wherein said first coil is characterized as having a first number of turns and said second coil is characterized as having a second number of turns, and wherein said first and second numbers of turns are not equal.

15. Fault current limiting apparatus for limiting excessive current in a circuit, said apparatus comprising:
  a first superconducting coil carrying a first current producing a first magnetic flux, wherein said first coil has a first critical current $I_{c1}$ and a first inductance $L_1$; and
  a second superconducting coil magnetically coupled to said first coil and carrying a second current producing a second magnetic flux, wherein said first and second magnetic fluxes are opposed and cancel each other to provide a low impedance under normal operating conditions, wherein said second coil has a second critical current $I_{c2}$ and a second inductance $L_2$, where $I_{c1} > I_{c2}$ and $L_1 < L_2$, and wherein a large fault current in said second coil produces a magnetic flux density imbalance and inductively increases the impedance in said first and second coils for limiting the fault current in the circuit.

* * * * *